No. 878,601. PATENTED FEB. 11, 1908.
H. F. BICKEL.
AIR BRAKE APPARATUS.
APPLICATION FILED OCT. 15, 1906.

Witnesses:
G. A. Williams
Jas. J. Maloney

Inventor:
Henry F. Bickel,
by his attys.

UNITED STATES PATENT OFFICE.

HENRY F. BICKEL, OF PLAINFIELD, NEW JERSEY, ASSIGNOR TO NEW YORK AIR BRAKE COMPANY, A CORPORATION OF NEW JERSEY.

AIR-BRAKE APPARATUS.

No. 878,601.   Specification of Letters Patent.   Patented Feb. 11, 1908.

Application filed October 15, 1906. Serial No. 338,996.

*To all whom it may concern:*

Be it known that I, HENRY F. BICKEL, a citizen of the United States, residing in Plainfield, in the county of Union and State of New Jersey, have invented an Improvement in Air-Brake Apparatus, of which the following description, in connection with the accompanying drawings, is a specification, like letters on the drawings representing like parts.

This invention relates to air brake apparatus, and has for its object to provide for the rapid exhaust of air from the brake cylinders to render the release of the brakes very prompt.

The invention is especially useful when applied to the straight air system such as is commonly used on switching engines, and under like conditions, although not limited to that use, and it consists principally in a valvular device employed in the pipe through which air is admitted to and exhausted from the brake cylinder, and operated in response to movement of air in said pipe from the brake cylinder, to open a vent directly to the atmosphere through which the air may escape from the brake cylinder to effect the prompt release of the brakes.

Figure 1:
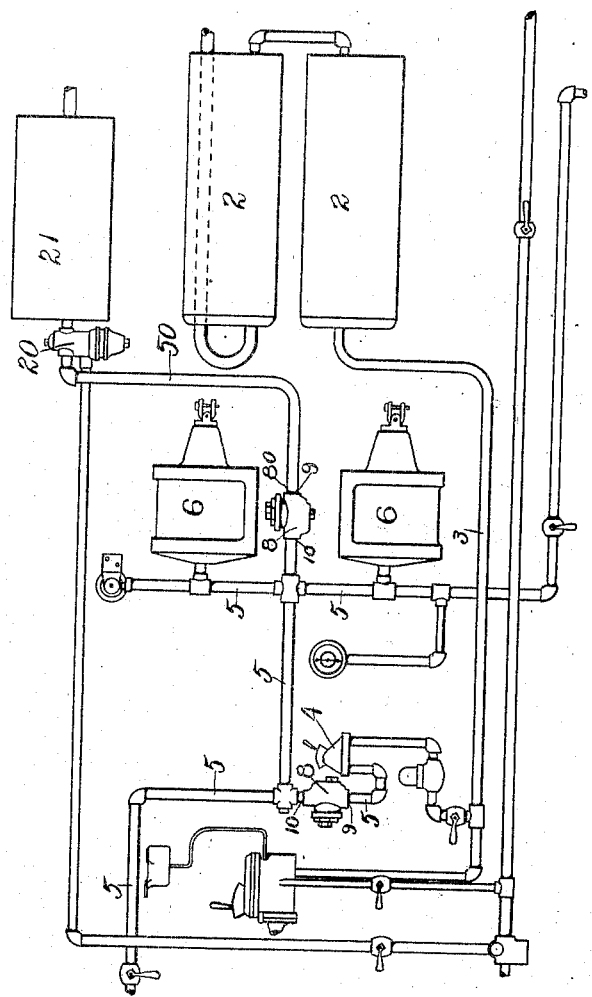
Figure 2:
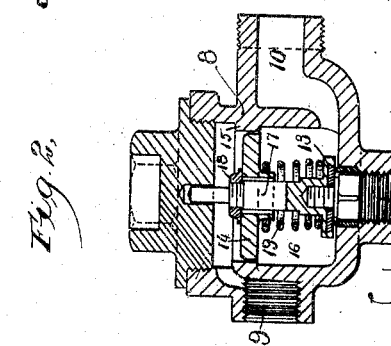

Figure 1 is a diagram showing an air brake apparatus containing an embodiment of the invention; and Fig. 2 is a sectional view of the valvular appliance by which the exhaust from the brake cylinders is effected.

In the diagram, Fig. 1, are represented the principal components of locomotive equipment such as commonly employed upon switching engines and comprising a straight air system; and also an automatic system which may be used when the locomotive is coupled to a train and the brakes upon the train are in service.

In the straight air system, the compressed air for operating the brakes is contained in the usual main reservoirs 2 from which air passes through the pipe 3 to the engineer's valve 4, and thence to the pipe 5 which communicates directly with the brake cylinders 6, those pertaining to the driving wheels of the locomotive only being shown in the diagram.

The valvular appliance 8 is contained in the pipe 5 between the engineer's valve and the brake cylinders, at any convenient point, being in the pipe through which air flows into and out from the brake cylinders in the respective operations of applying and releasing the brakes, which will be called the brake cylinder pipe. Referring to Fig. 2, said valvular appliance comprises a body or shell having passages 9 and 10 communicating with the said brake cylinder pipe 5, the former on the side towards the engineer's valve, and the latter on the side towards the brake cylinders, and the said valve shell is also provided with an outlet 12 leading directly to the atmosphere and terminating within the shell in a valve seat.

The escape of air from the valve shell through the passage 12 is controlled by a valve 13 normally held seated by the pressure in the brake cylinder pipe when air is admitted thereto for applying the brakes and retaining them applied, and coöperating with said valve is a piston or diaphragm 14 fitting loosely in a contracted cylindrical portion 15 between the inlet 9 to the valve body and the main chamber 16 in the valve body communicating with the outlet 10, using the terms "inlet" and "outlet" with reference to the passage of air from the main reservoir and engineer's valve to the brake cylinders.

The piston 14 is movable relative to the valve 13, being shown as guided upon the stem 17 thereof and pressed against a stop or shoulder 18 by a spring 19 which admits of the movement of piston 14 towards the valve 13 when the pressure at the inlet side 9 is greater than at the outlet side 10, as is the case when air is being admitted through the brake cylinders to apply the brakes.

The operation is as follows: Normally when the brakes are not applied, there is no pressure in the brake cylinder pipe, and the valve 13 remains seated by gravity or may remain open. When, however, air is admitted to the brake cylinder pipe to apply the brakes, it acts upon the piston 14, tending to move the same towards the valve 13, and through the spring 19 to press the said valve to its seat, and thus close the exhaust passage 12. The rush of air through the pipe 5 to the brake cylinder moves the piston 14 into the enlarged portion of the chamber 16, and thus affords sufficient freedom for the passage of air through the outlet 10 to the brake cylinders to apply the brakes promptly. As soon as the movement of the air ceases, the pressure upon the piston 14 becomes practically balanced, but the valve 13 remains seated by the pressure in the brake cylinder. When it is desired to release the brakes, the engineer's valve is operated, as usual, to permit air to escape from the brake cylinder pipe, and in this operation, the pressure on the piston 14 of the air coming back from the brake cylinders will be greater than the pressure on said piston between it and the engineer's valve, and by reason of the greater area of the piston 14 than that of the exhaust passage 12, the pressure of the air flowing from the brake cylinder will lift the valve 13 and thus open the large exhaust passage 12 directly to the atmosphere, so that the air from the brake cylinders and train pipe will be very quickly exhausted and the brakes released much more promptly than if the only exhaust passage provided was that through the engineer's valve. The valvular appliance thus operates in response to the flow of air towards or from the brake cylinder, and it obviously is equally adapted to operate in the automatic system, and may be applied as shown at 80 in the brake cylinder pipe or duct 50 leading from the triple valve 20 and auxiliary reservoir 21 of the automatic system when used. When thus applied in the pipe 50, through which air is supplied to and exhausted from the brake cylinders, the operation is the same as before described in the straight air system. The movement of air from the auxiliary reservoir through the pipe 50 to the brake cylinders in applying the brakes causes the exhaust valve 13 to be closed, if not already closed, and the air in passing to the brake cylinder moves the piston 14 towards the valve 13 and into the enlarged chamber 16, so that the flow of air to the brake cylinder is not materially obstructed. When, however, the triple valve moves to the position to exhaust air from the brake cylinder through the pipe 50, the back flow of air from the brake cylinder acting upon the piston 14 lifts the valve 13, and thus opens the exhaust passage 12 from the brake cylinder direct to the atmosphere which affords a more direct escape of the air from the brake cylinders than that afforded through the usual exhaust through the triple valve.

Claims.

The combination with the brake cylinder of an air brake apparatus and the pipe or duct through which air is supplied thereto and exhausted therefrom; of the valvular appliance communicating with said brake cylinder supply and exhaust pipe, and provided with an exhaust opening to the atmosphere; a valve controlling the said exhaust opening; and a piston yieldingly connected with said valve and movable relative thereto, said piston being moved relative to said valve in response to flow of air towards the brake cylinder, and being engaged with the said valve and operated to open the same in response to flow of air from the brake cylinder, substantially as described.

In testimony whereof, I have signed my name to this specification in the presence of two subscribing witnesses.

HENRY F. BICKEL.

Witnesses:
C. E. LEACH,
C. S. HENRY.